United States Patent [19]
Gallagher

[11] Patent Number: 5,945,913
[45] Date of Patent: Aug. 31, 1999

[54] LIQUID LEVEL ALARM SYSTEM

[76] Inventor: Daniel J. Gallagher, 10466 Greentrail Dr. N., Boynton Beach, Fla. 33436

[21] Appl. No.: 08/858,110

[22] Filed: May 19, 1997

Related U.S. Application Data

[63] Continuation-in-part of application No. 08/705,756, Aug. 30, 1996, which is a continuation-in-part of application No. 08/579,589, Dec. 26, 1995, Pat. No. 5,610,591.

[51] Int. Cl.$^6$ .................................................... G08B 21/00
[52] U.S. Cl. ........................... 340/618; 73/319; 116/228; 116/110; 200/84 R; 340/624
[58] Field of Search ..................................... 340/618, 623, 340/624; 73/307, 308, 319; 116/110, 228; 137/558; 251/309; 200/61.04, 84 B, 84 R

[56] References Cited

U.S. PATENT DOCUMENTS

| | | | |
|---|---|---|---|
| 1,096,470 | 5/1914 | Stern ........................................ | 340/618 |
| 2,714,641 | 8/1955 | Van Nort ................................. | 340/624 |
| 3,857,358 | 12/1974 | Ward et al. ............................. | 116/110 |
| 3,894,555 | 7/1975 | Payne ..................................... | 200/84 R |
| 4,180,095 | 12/1979 | Woolley et al. ........................ | 200/84 R |
| 4,459,584 | 7/1984 | Clarkson ................................. | 340/624 |
| 4,473,730 | 9/1984 | Ida .......................................... | 340/624 |
| 4,724,706 | 2/1988 | Stiever ................................... | 116/228 |
| 4,962,661 | 10/1990 | Levine et al. .......................... | 200/84 R |
| 5,054,319 | 10/1991 | Fling ....................................... | 73/319 |
| 5,144,700 | 9/1992 | Martin .................................... | 340/624 |

*Primary Examiner*—Jeffery A. Hofsass
*Assistant Examiner*—John Tweel, Jr.
*Attorney, Agent, or Firm*—Richard L. Huff

[57] ABSTRACT

A liquid level alarm system is activated when liquid in a container falls below a predetermined level. The system contains an alarm located outside the container. The alarm is electrically connected to a switching device. The switching device may have a push-down button located on the top, an "on-off" switch located on the side, or a sliding switch located on the side. When the switch is pushed down, the switching device activates the alarm. In one embodiment, the container has a vertically positioned rod adjacent the switching device. There is a float slidably connected to the rod by a connecting rod and hook. The float rises and falls with the level of the liquid. On the side of the rod opposite the float there is a switch contact which makes contact with the switch when the level of the liquid falls below a predetermined level and the float is no longer supported by the liquid. In another embodiment, a float is positioned on tracks so that the switch will be forced down by the float when the liquid level falls below a predetermined point. The tracks contain slots allowing rollers attached to the float to freely rise and fall with the liquid level while maintaining its position relative to the switch. The switching device may be electrically connected to a motor which, when activated, changes a valve in an inlet pipe from the open position to the closed position.

10 Claims, 7 Drawing Sheets

LIQUID LEVEL ALARM SYSTEM

CROSS-REFERENCE TO RELATED APPLICATIONS

This application is a continuation-in-part of Ser. No. 08/705,756, filed Aug. 30, 1996, which is a continuation in-in-part of Ser. No. 08/579,589, filed Dec. 26, 1995, now U.S. Pat. No. 5,610,591.

BACKGROUND OF THE INVENTION

1. Field of the Invention

This invention is directed to alarm systems and automatic shut-off systems which will be activated when the liquid in a container falls below a predetermined level.

2. Description of the Related Art

The prior art is aware of devices which signal the rising of liquids in various containers above predetermined levels. French Pat. No. 2 254 016 and U.S. Pat. Nos. 4,962,370; 4,988,978; 5,006,834; and 5,028,910 are examples of such devices. U.S. Pat. No. 4,988,978 is also adapted to emit a signal when the liquid falls below a predetermined level. The device of this patent is complex and is not easily adjustable to provide for varying predetermined levels of the liquid. Also, the device is useable only when the container is fitted with the particular cover defined in the patent, and cannot be retrofitted into existing containers. U.S. Pat. No. 4,968,976 teaches an alarm kit useful for emitting an alarm when water in a container falls below a predetermined level. The alarm of this device is triggered by the pivoting of an arm against a spring to close an electrical circuit. The alarm of this device must be in the same housing as the activator for the alarm. Thus, the alarm could not be in a unified security system. For purposes of this invention, a unified security system is considered to be a system in which a plurality of individual monitoring devices supply data to a central location at which the status of the individual devices is checked and action can be initiated if an alarm is triggered. The device must be mounted outside the container. Thus, the device could not be used on an outside storage tank where ice or snow would render the device inoperative. Further, the float is connected to the arm by a long, flexible line which would get wrapped around any objects in the container. Therefore, the device could not be used as an alarm system in a commode or other container which contains elements which would serve to snare the line.

The prior art is aware of automatic flood control valves which, upon the detection of leakage in a system, shut a valve in the intake pipe, as seen in U.S. Pat. No. 4,659,063 to Veillette et al. Petcocks are known for the purpose of controlling liquid flow from containers, as seen in U.S. Pat. No. 3,931,954 to Guzzetta.

The inventor's earlier invention disclosed in U.S. Ser. No. 08/579,589, now U.S. Pat. No. 5,610,591 is directed to a liquid level alarm system in which an alarm is activated when liquid in a container falls below a predetermined level. The system contains an alarm which is mounted outside the container, which alarm is electrically connected to an activation device which is contained within a housing which may be inside or outside the container. A single-pull switch arm is connected to the activation device and protrudes from the housing. One end of a line is attached to the distal end of the arm and the other end of the line is wound about a spring reel mounted on an axle connected to a float. When the surface of the liquid is between a predetermined upper and lower level, the spring reel maintains the line taut directly below the switch arm. The line is of such a length that should the liquid in the container drop below a predetermined level, the float will no longer be supported by the liquid, and the weight of the float will pull the arm down to activate the alarm. This system is quite satisfactory for its intended purpose. It may be used in small containers such as commodes, or large containers such as oil tanks. It may have an alarm attached directly to the container, or the alarm may be part of a unified system. The predetermined lower level for the liquid may be readily established by adjusting the length of line attached to the spool. The present invention is intended to be an improvement over the earlier invention in that it shares the same benefits and is of simpler design.

SUMMARY OF THE INVENTION

The present invention is directed to an alarm system which will be activated by the falling of liquid in a container below a predetermined low point. The alarm system contains an alarm positioned outside of the container and an electrical switching means positioned inside the container at the level of the predetermined lower level of the liquid for activating the alarm. In one embodiment of the invention, the switching means has an upwardly extending push-button switch located at the top or side of the switching means. In another embodiment of the invention, the switching means has a vertically sliding switch located at a side of the switching means. There is an electrical connection between the switching means and the alarm. In one embodiment of the present invention, there is a bow hook rod which is non-circular in cross-section and which extends vertically in the container near the switching means. In another embodiment of this invention, there is a pair of tracks positioned vertically within the container and extending between a point near the predetermined high point of the liquid surface to point near the predetermined low point of the liquid surface, which tracks contain slotted surfaces. The system of this invention contains a float suitable for floating on the surface of the liquid and which is of such a weight as to be capable of actuating the switching means when the weight of the float rests upon the push button switch or vertically sliding switch of the switching means. In one embodiment of this invention, a bow hook is slidably attached to the bow hook rod. In this embodiment, a connecting rod connects the float to the bow hook to allow the float to rise or fall with the level of the liquid but maintain its position near the switching means. In this embodiment, a switch contact is connected to the bow hook opposite the connecting rod and the float, which switch contact will transfer the weight of the float to the push button actuator or vertically sliding switch when the level of the liquid falls below a predetermined level, thus activating the alarm. In another embodiment of this invention, the float contains at least two flat sides connected to rollers and is positioned so that the rollers fit into the slots in the tracks allowing the float to move freely vertically along the tracks as the liquid level changes. The float contains an end which overhangs the push button switch or vertically sliding switch and will push down the switch to activate the alarm when the level of the liquid falls below the predetermined lower liquid level point. In one embodiment of this invention, the activation of the electrical switching means will activate a valve in the intake pipe of the container to automatically shut off the intake pipe.

DESCRIPTION OF THE PREFERRED EMBODIMENTS

The invention will now be more particularly described with reference to the above drawing, like numerals referring to like features throughout.

Figure 1:
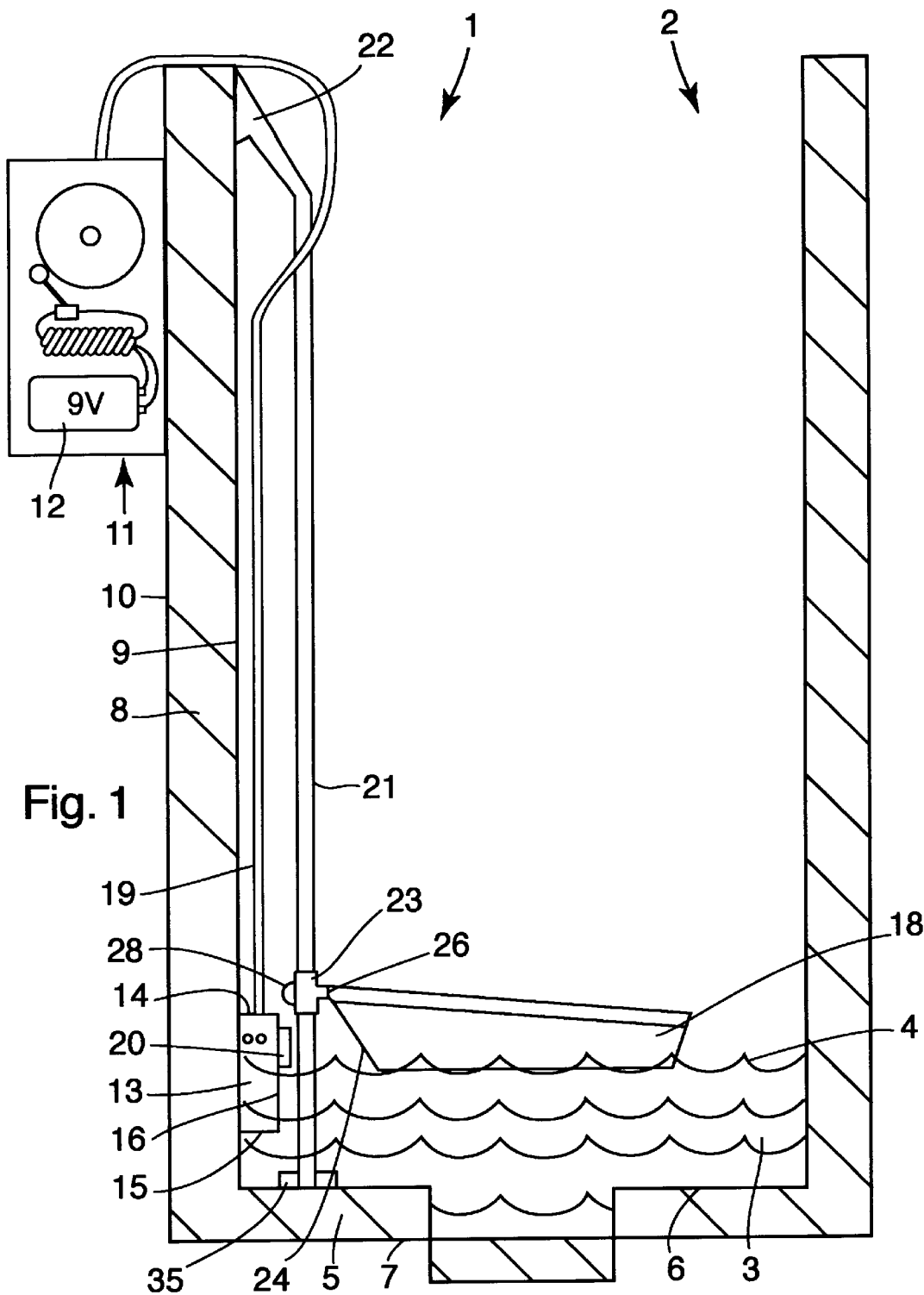
FIG. 1 is a cross-sectional view of one embodiment of the alarm system of this invention in combination with a container.
Figure 2:
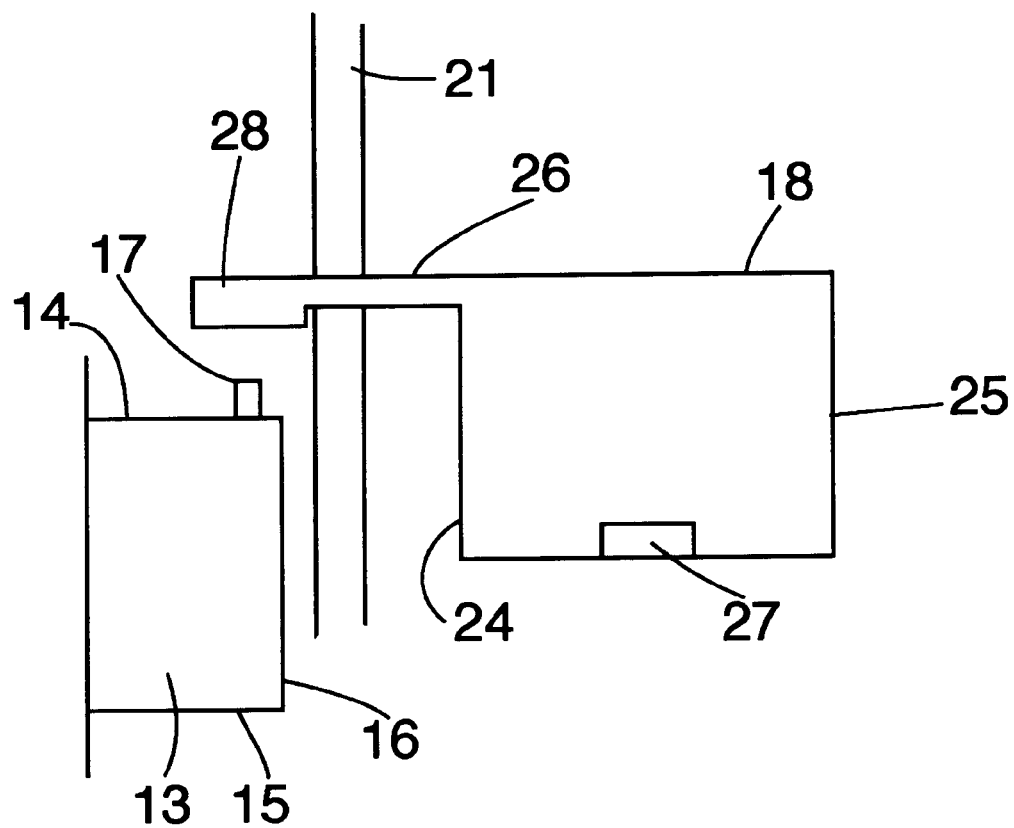
FIG. 2 is a side view of the electrical switching means, switch contact, bow hook, float, connecting rod, and bow hook rod of the present invention showing these elements of the invention in greater detail.
Figure 3:
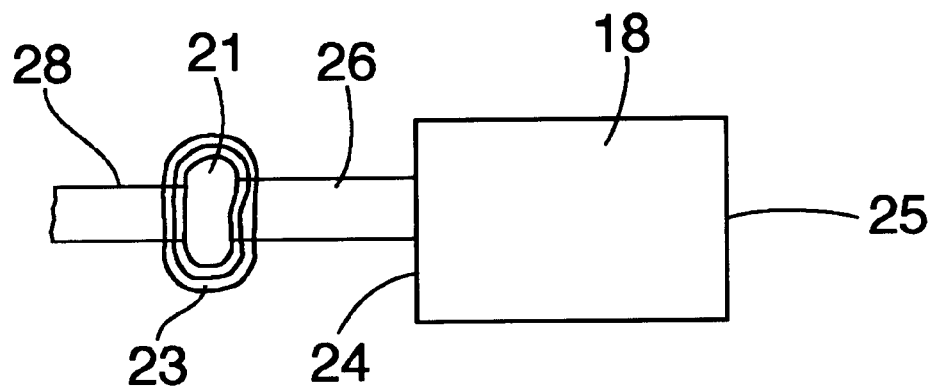
FIG. 3 is a top plan view showing the float, connecting rod, bow hook, switch contact, and bow hook rod in detail.
Figure 4:
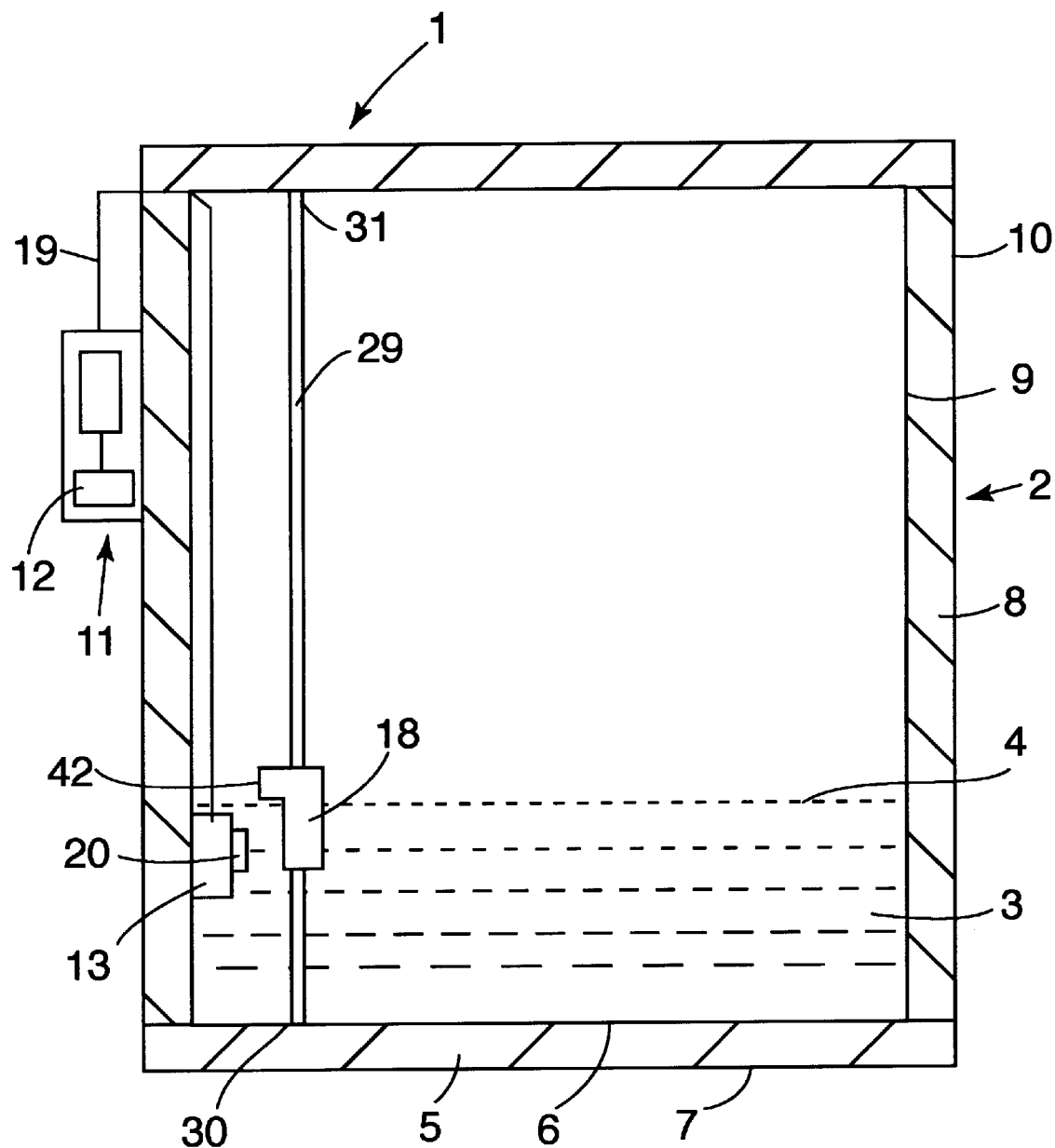
FIG. 4 is a vertical cross-sectional view from the front of another embodiment of the alarm system of this invention in combination with a container.
Figure 5:
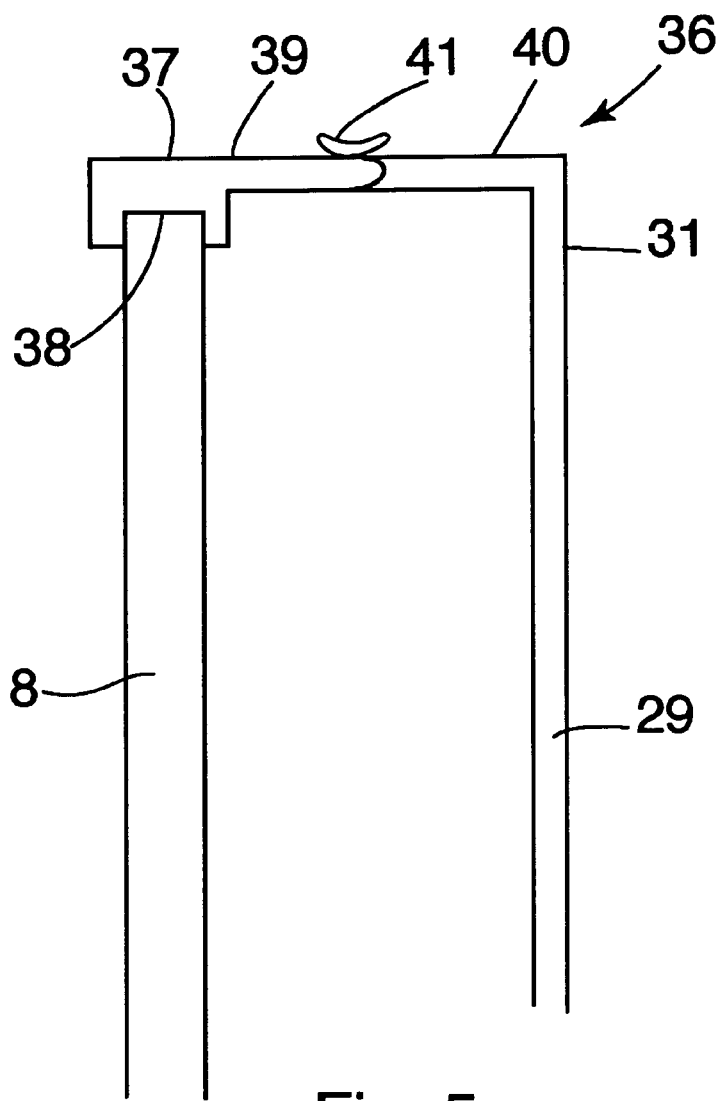
FIG. 5 is an elevational side view showing the connection of a track of one embodiment of this invention to the back of the container.
Figure 6:
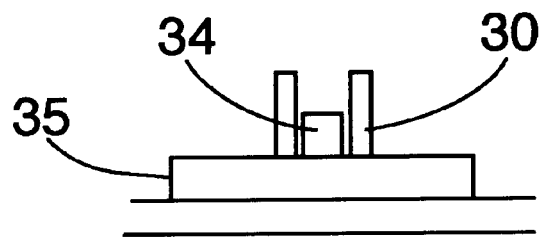
FIG. 6 is an elevational side view showing the connection of a track of one embodiment of this invention to the bottom of the container.
Figure 7:
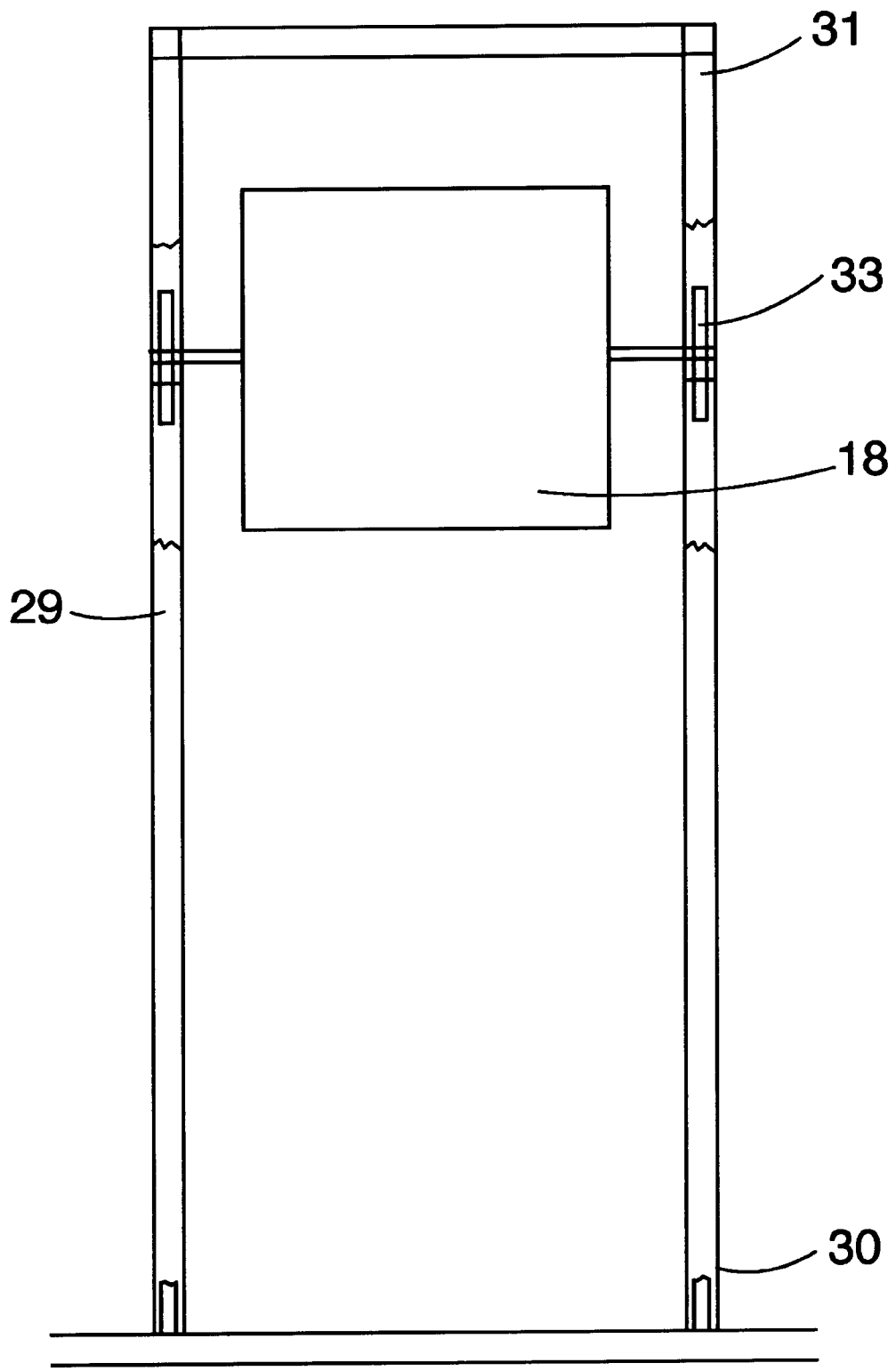
FIG. 7 is a elevational side view of a float of the present invention mounted on tracks, one side of the tracks being partially removed for clarity.
Figure 8:
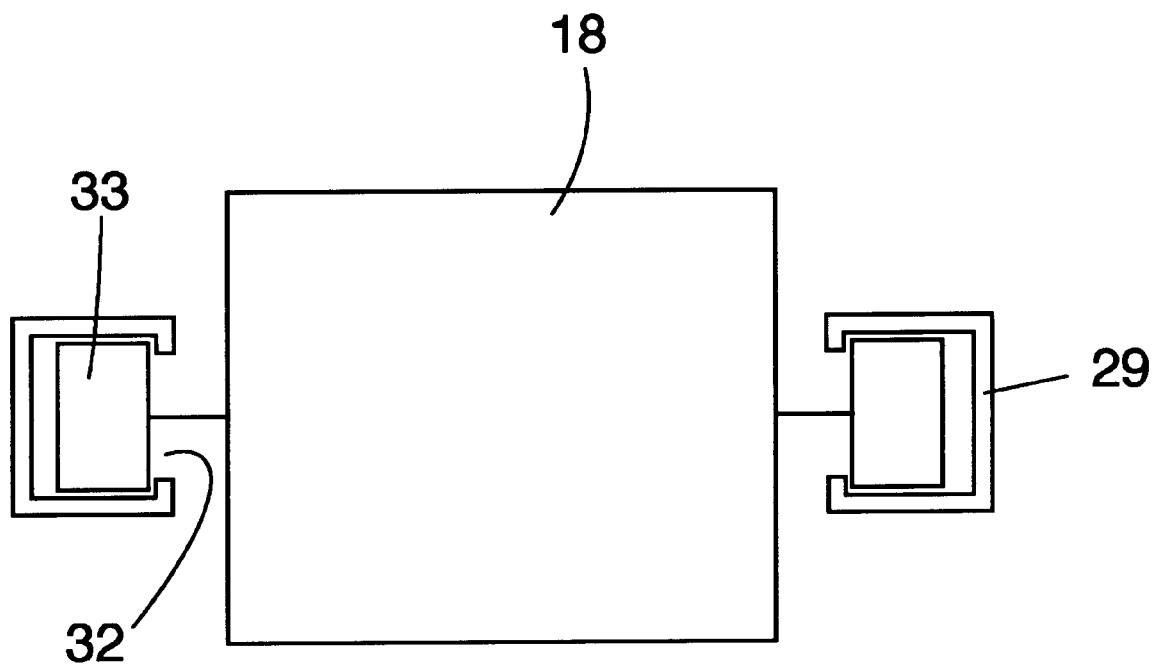
FIG. 8 is a top plan view of a float of one embodiment of the present invention mounted on tracks with rollers.
Figure 9:
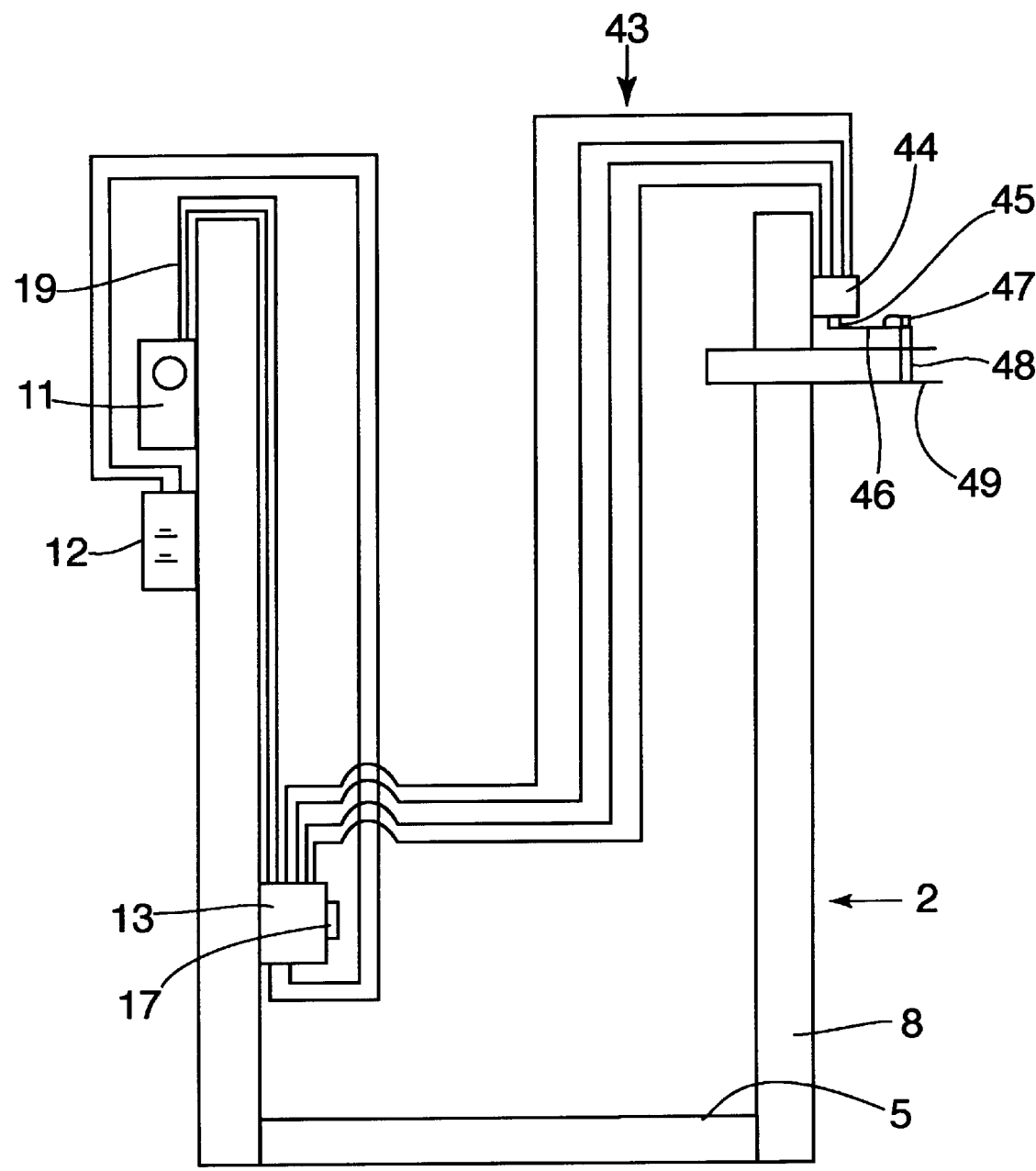
FIG. 9 is a schematic view of the electrical system for the alarm and shut-off valve of this invention.

Referring to FIGS. 1–9, an alarm system 1 according to this invention is shown. A container 2 forms a reservoir which contains a liquid 3 which has a surface level 4 which fluctuates between a predetermined high point (not shown) and a predetermined low point (not shown). The container 2 has a bottom 5 having inner 6 and outer 7 surfaces and at least one wall 8 having inner 9 and outer 10 surfaces. The container 2 may be made of conventional materials, such as ceramic, plastic, or metal. The size of the container 2 is not critical in the context of the present invention, and may be adapted for use inside or outside buildings.

The nature of the liquid 3 which may be used in the present invention is broad in scope. The liquid 3 may be water when the container 2 is a hot water heater, a commode, or a storage tank. Likewise, because the to-be-described electrical switching means is hermetically sealed, the liquid 3 may be a hydrocarbon or other flammable or explosive liquid. The liquid 3 has a surface level 4 which is intended to fluctuate between a predetermined high point and a predetermined low point. The purpose of the system 1 is to give notice when the liquid 3 falls below the predetermined low point because of normal usage or because of a rupture in or near the bottom 5 of the container 2.

The system 1 contains an alarm means 11 outside the container 2. The alarm means 11 may be attached directly to the container 2 or may be at a distance therefrom. The alarm means 11 may be a bell, siren, or other audible device. Alternatively, the alarm means 11 may be a light or other visible signal. The alarm means 11 contains the power source 12 for the alarm system or the power source may be in a separate container. The alarm means 11 may be incorporated into a unified security system (not shown). For purposes of this invention, a unified system is one in which the alarm means 11 is positioned at a point distant from the container, usually in combination with other alarm means so that numerous security situations may be monitored simultaneously.

The alarm system 1 also contains an electrical switching means 13 which is positioned inside the container 2 at a vertical position which is near the predetermined low point of the liquid surface 4. The switching means 13 has a top 14, a bottom 15, and at least one side 16. The horizontal positioning of the switching means 13 is not critical. Preferably, it is attached to an inner surface 9 of the wall 8 of the container 2 by conventional means, such as screws, bolts, VELCRO, and snap-on supports. The switching means 13 is so constructed as to be readily repositioned as the determination of a low point of the surface level 4 of the liquid 3 changes. When the predetermined low point is near the bottom 5 of the container 2, the electrical switching means 13 may be attached to the bottom 5 of the container 2. The electrical switching means 13 is hermetically sealed to avoid damage to the switching means 13 and to provide safety in those instances when the liquid 3 inside the container 2 is flammable or explosive. The design of the switching means 13 is simple. In one embodiment, the switching means contains a push button 17 which is pushed down by the weight of the float 18. The switching means 13 contains an open circuit when the button 17 is in the "up" position. When the button 17 is pushed down, the circuit is closed, actuating the switching means 13 and activating the alarm means 11 by way of a connecting means 19 for electrically connecting the switching means 13 and the alarm means 11. Preferably, the push button 17 is on the top 14 of the switching means 13. Alternatively, the button 17 may be located on a side 16. The means 19 for connecting the switching means 13 to the alarm means 11 is preferably insulated electrically conductive wire. In another embodiment, the switching means 13 contains a vertically sliding switch 20. When the switch 20 is in the "up" position, the circuit is open. When the switch 20 is pushed down by the weight of the float 18, the circuit closes, and the alarm means 11 is activated.

In one embodiment, a bow hook rod 21 is located adjacent to the electrical switching means 13. Preferably, the bow hook rod 21 is attached to a wall 8 of the container 2 by a hook-shaped upper portion 22 of the bow hook rod 21. For large containers 2, the bow hook rod 21 is attached to a base plate 35, which plate is secured to the inner surface 6 of the bottom 5 of the container 2. The bow hook rod 21 is non-circular in cross-section. Thus, it may be rectangular, oval, semicircular or circular with at least one notch or protrusion.

The bow hook 23 is slidably attached to the bow hook rod 21. The bow hook 23 has the same relative shape as the bow hook rod 21, but is slightly larger in cross-section than the bow hook rod 21. Exact dimensions are not critical, however one-sixteenth of an inch of clearance has been found to be preferable. Because of this relationship of shapes, the bow hook 23 is able to maintain its relative position as it travels vertically along the bow hook rod 21.

A float 18 having a proximal end 24 and a distal end 25 is attached to the bow hook 23 by way of a connecting rod 26. This attachment is at a side of the bow hook rod 21 opposite the electrical switching means 13. The float 18 is of any geometrical shape, although boat-shaped, spherical, and hexahedral are preferred, The float 18 may be solid or hollow and may be made of any conventional material. When the float 18 is hollow, a suitable amount of ballast 27 may have to be added to enable the weight of the float 18 to be sufficient to push the push button 17 or the vertical slide 20 into the "down" position. The float 18 must be so constructed as to float in the liquid 3 which is held in the container 2. Also, the float 18 must have sufficient weight so that when the float 18 is no longer supported by the liquid 3, the weight of the float 18 is sufficient to press down the button 17 20 on the electrical switching means 13.

A contacting means 28 is attached to the bow hook 23 opposite the connecting rod 26 and float 18. As the level of the liquid 3 in the container 2 falls below the predetermined level, the contacting means 28 comes in contact with the button 17 on the electrical switching means 13 and presses the button 17 down so as to close the circuit in the electrical switching means 13. Preferably, the contacting means 28, bow hook 23, connecting rod 26 and float 18 are constructed of the same material.

As an alternative, a float 18 having a flat bottom may be positioned directly above the button 17 on the electrical switching means 13. In this situation, the float 18, itself, pushes down the button 17, eliminating the need for a separate contacting means 28.

In a separate embodiment of this invention, the bow hook rod 21 is replaced by a pair of tracks 29. Each track 29 contains a lower end 30, an upper end 31, and a slot 32 which is able to hold rollers 33 connected to the float 18. The tracks 29 may be connected to the bottom 5 of the container 2 by a holding means. A preferred holding means is attached to the bottom 5 by welds, glue, or screws and contains a base plate 35 having an upraised protrusion 34 onto which the track 29 fits snugly. The track 29 is connected to the wall 8 of the container 2 by an adjustable upper holding means 36. This holding means comprises a distal end 37 containing a slot 38 which fits over the wall 8, a first, outer section 39, and a second, inner section 40. The inner section 40 slidably fits into the outer section 39 allowing for the distance of the track 29 from the wall 8 to be easily adjustable. When properly adjusted, the inner 40 and outer 39 sections are secured in place. A wing bolt 41 is an example of means for securing these sections. By this means, the upper end 31 of the track 29 maintains rigidity and proper placement while avoiding contact with the walls 8 of the container 2.

In this embodiment, rollers 33 of the float 18 fit loosely into the slots 38 in the tracks 29 and thus enable the float 18 to freely travel vertically with the rise and fall of the liquid.

The float 18 contains an overhang 42. The positioning of this overhang 42 is not critical, but is preferably near the top of the float 18. This overhang 42 is so positioned that it will press down upon the push button switch 17 or vertical slide switch 20 when the level of the liquid 3 is such that the switch 17 20, rather than the liquid 3, bears the weight of the float 18.

Upon closing of the circuit in the switching means 13, the alarm 11 is activated through connecting means 19. A separate electrical connecting means 43 connects the switching means 13 with a motor 44. The motor 44 contains a rotatable shaft 45 which is attached through a connecting line 46 to the handle 47 of a petcock 48. The petcock 48 is sealed into, and may freely rotate in, inlet pipe 49. Upon closing of the circuit in switching means 13, the motor 44 is activated, turning the shaft 45 and turning the handle 47 of the petcock 48. This rotates the petcock 48 90° from the open position to the closed position, thus automatically turning off the inflow of the liquid in the inlet pipe 49.

It can readily be seen that the system of this invention is simple in construction, but may be adjusted to give an alarm and cut off the inflow of liquid at a precise predetermined level of liquid in a container.

It will be appreciated that modifications can be made in the details of the invention without departing from the inventive aspect of the invention, which is set forth in the following claims.

I claim:

1. An alarm system for use in a container having a top having inner and outer surfaces, a bottom having inner and outer surfaces, and at least one wall having an inner and outer surface, which container contains a liquid having a surface level which fluctuates between a predetermined high point and a predetermined low point; said system comprising:

(a) an alarm means to be positioned outside the container;
    (b) A pair of tracks having an upper end and a lower end to be positioned vertically within the container and extending at least between a point near the predetermined high point of the liquid and a point near the predetermined low point of the liquid;
    (c) an electrical switching means to be positioned inside the container near the predetermined low point of the liquid surface, said switching means having a top, a bottom, and at least one side, the top or the side of said switching means having a switch, which switch is capable of being pushed vertically downwardly to actuate an activating mechanism contained within the switching means which, in turn, activates the alarm;
    (d) a connecting means for electrically connecting the switching means and the alarm means; and
    (e) a float suitable for floating on the surface of the liquid, said float having rollers attached thereto, which rollers fit in the tracks allowing the float to move vertically as the liquid rises and falls yet maintain its position relative to the switching means, said float being capable of depressing the switch when the level of the liquid falls to a point which is sufficiently low that the weight of the float presses down upon the switch, the spatial correspondence between the float and the switch being such that the float comes in direct contact with the switch when the surface level of the liquid falls to the predetermined low point.

2. A combination comprising a container and the alarm system defined in claim 1.

3. The combination of claim 2, wherein the switch is on top of the switching means.

4. The combination of claim 2, wherein the switch is on a side of the switching means.

5. The combination of claim 2, wherein the alarm system is part of a unified security system.

6. The combination of claim 2, wherein the alarm comprises an audible indicator.

7. The combination of claim 2, wherein the container is a commode reservoir, the alarm means is attached to the commode, and the connecting means passes from outside the reservoir to inside the reservoir between the top and a side of the reservoir.

8. The combination of claim 2, wherein the float is spherical in shape.

9. The combination of claim 2, wherein the container has an inlet pipe; an electrical connecting means connects the switching means to a motor containing a rotatable shaft; and the rotatable shaft is connected to a valve in the inlet pipe, which valve has an open and a closed position, so that when the switching means is activated the valve in the inlet pipe is moved from the open position to the closed position.

10. The combination of claim 9, wherein the valve is a petcock valve.

* * * * *